(12) United States Patent
Fujimoto

(10) Patent No.: US 11,503,444 B2
(45) Date of Patent: Nov. 15, 2022

(54) BASE STATION AND CONTROL METHOD THEREOF POSSIBLE TO IMPROVE COMMUNICATION QUALITY IN ROAD-TO-VEHICLE COMMUNICATION

(71) Applicant: KYOCERA Corporation, Kyoto (JP)

(72) Inventor: Shinobu Fujimoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/155,154

(22) Filed: Jan. 22, 2021

(65) Prior Publication Data

US 2021/0152993 A1 May 20, 2021

Related U.S. Application Data

(63) Continuation of application No. PCT/JP2019/029093, filed on Jul. 24, 2019.

(30) Foreign Application Priority Data

Jul. 26, 2018 (JP) .............................. JP2018-140416

(51) Int. Cl.
*H04W 4/44* (2018.01)
*H04W 16/28* (2009.01)

(52) U.S. Cl.
CPC ............. *H04W 4/44* (2018.02); *H04W 16/28* (2013.01)

(58) Field of Classification Search
CPC ..... H04W 16/28; H04W 84/12; H04W 24/04; H04W 4/08; H04W 40/244; H04W 64/003; H04W 8/186; H04W 88/08; H04W 24/02; H04W 72/046; H04W 76/19; H04W 84/10; H04W 84/22; H04W 24/08; H04W 28/0289; H04W 52/241; H04W 84/18; H04W 88/18; H04B 7/0452; H04B 7/10; H04B 7/0617; H04B 1/1027; H04B 1/40; H04B 10/299; H04B 7/0491; H04B 7/0626; H04B 7/18513; H04B 10/0793; H04B 7/0408; H04B 7/0469; H04B 7/0619; H04B 7/0621; H04B 7/0634; H04B 7/0857; H04B 7/18515; H04B 7/18519; H04B 7/18521;
(Continued)

(56) References Cited

U.S. PATENT DOCUMENTS

2014/0154992 A1* 6/2014 Silverman ............ H04B 7/0626
455/63.4
2017/0201461 A1* 7/2017 Cheng ................... H04L 47/286
(Continued)

FOREIGN PATENT DOCUMENTS

JP 2003-196692 A 7/2003
JP 2010-183261 A 8/2010

OTHER PUBLICATIONS

ARIB STD-T109 Version 1.3 published on Jul. 27, 2017.

*Primary Examiner* — Golam Sorowar
(74) *Attorney, Agent, or Firm* — Studebaker & Brackett PC

(57) ABSTRACT

A base station 200 provided around a road including: a receiver 213 configured to receive a first communication signal broadcasted from a mobile station installed on a vehicle, a controller 230 configured to calculate antenna weight forming a beam to the mobile station based on the received first communication signal, and a transmitter 214 configured to transmit a second communication signal to the mobile station by a transmission beamforming, by using the calculated antenna weight.

9 Claims, 6 Drawing Sheets

(58) Field of Classification Search
CPC ............ H04B 7/18526; H04B 7/18563; H04B 7/2041; H04B 1/401; H04B 10/50; H04B 7/086; H04B 7/12

See application file for complete search history.

(56) References Cited

U.S. PATENT DOCUMENTS

| | | | | |
|---|---|---|---|---|
| 2018/0227026 A1* | 8/2018 | Kim | ..................... | H04B 7/0695 |
| 2018/0343604 A1* | 11/2018 | Wu | ..................... | H04W 64/006 |
| 2019/0288908 A1* | 9/2019 | Lee | ....................... | H04W 28/02 |
| 2019/0327618 A1* | 10/2019 | Li | ......................... | H04W 4/027 |

* cited by examiner

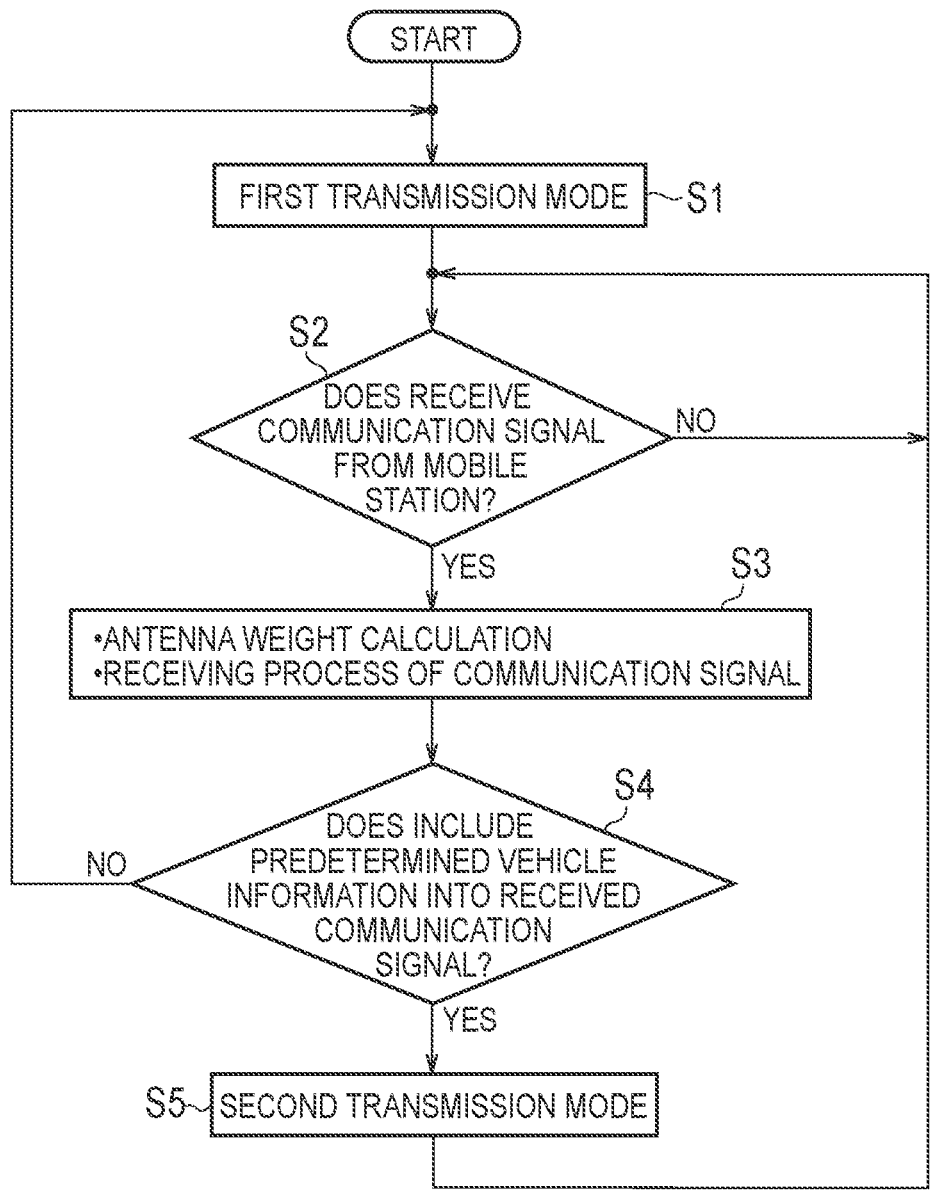

BASE STATION AND CONTROL METHOD THEREOF POSSIBLE TO IMPROVE COMMUNICATION QUALITY IN ROAD-TO-VEHICLE COMMUNICATION

RELATED APPLICATIONS

The present application is a continuation based on PCT Application No. PCT/JP2019/029093, filed on Jul. 24, 2019, which claims the benefit of Japanese Patent Application No. 2018-140416 filed on Jul. 26, 2018. The content of which is incorporated by reference herein in their entirety.

TECHNICAL FIELD

The present invention relates to a base station and control method thereof, for an intelligent transport system.

BACKGROUND ART

Recently, an intelligent transport system (ITS: Intelligent Transport System) is paid attention as a technology possible to avoid risk of a traffic accident. In this circumstance, the standards of a radio communication system including a base station installed at a roadside and a mobile station installed on a vehicle is specified in a non-patent literature 1.

The radio communication system performs road-to-vehicle communication transmitting and receiving a communication signal between a base station and mobile station and inter-vehicle communication transmitting and receiving the communication signal between the mobile stations. Here, regarding to the communication signal (communication packet), as a destination address (destination MAC address), a broadcast address is only specified. That is, the road-to-vehicle communication and inter-vehicle communication are performed by broadcast communication (broadcast).

CITATION LIST

Non-Patent Literature

Non-Patent Literature 1: ARIB STD-T109 version 1.3, "700 MHz BAND INTELLIGENT TRANSPORT SYSTEMS"

SUMMARY OF THE INVENTION

A base station according to a first disclosure is a base station provided around a road. The base station includes: a receiver configured to receive a first communication signal broadcasted from a mobile station installed on a vehicle, a controller configured to calculate antenna weight forming a beam to the mobile station based on the received first communication signal, and a transmitter configured to transmit a second communication signal to the mobile station by a beamforming, by using the calculated antenna weight.

A method according to a second disclosure is a control method of a base station provided around a road. The method includes: a step of receiving a first communication signal broadcasted from a mobile station installed on a vehicle, a step of calculating antenna weight forming a beam to the mobile station based on the received first communication signal, and a step of transmitting a second communication signal to the mobile station by a beamforming, by using the calculated antenna weight.

BRIEF DESCRIPTION OF DRAWINGS

FIG. 6 is a flow diagram illustrating an operation example of a base station according to an embodiment.

DESCRIPTION OF EMBODIMENTS

It is assumed that, in road-to-vehicle communication, a base station transmits a communication signal by a transmission directivity fixed along with an extending direction of a specific road such that a mobile station installed on a vehicle travelling with the specific road can receive the communication signal from the base station.

However, regarding to a method that the base station transmits the communication signal by the fixed transmission directivity in the road-to-vehicle communication, there is room for improvement in a point for improving communication quality in the road-to-vehicle communication.

Then, the present disclosure provides a base station and control method thereof possible to improve the communication quality in the road-to-vehicle communication.

It will be described with reference to the drawings about a radio communication system according to an embodiment. Further, in the following description of the drawings, same or similar parts are marked with same or similar signs.

(System Configuration)

Figure 1:
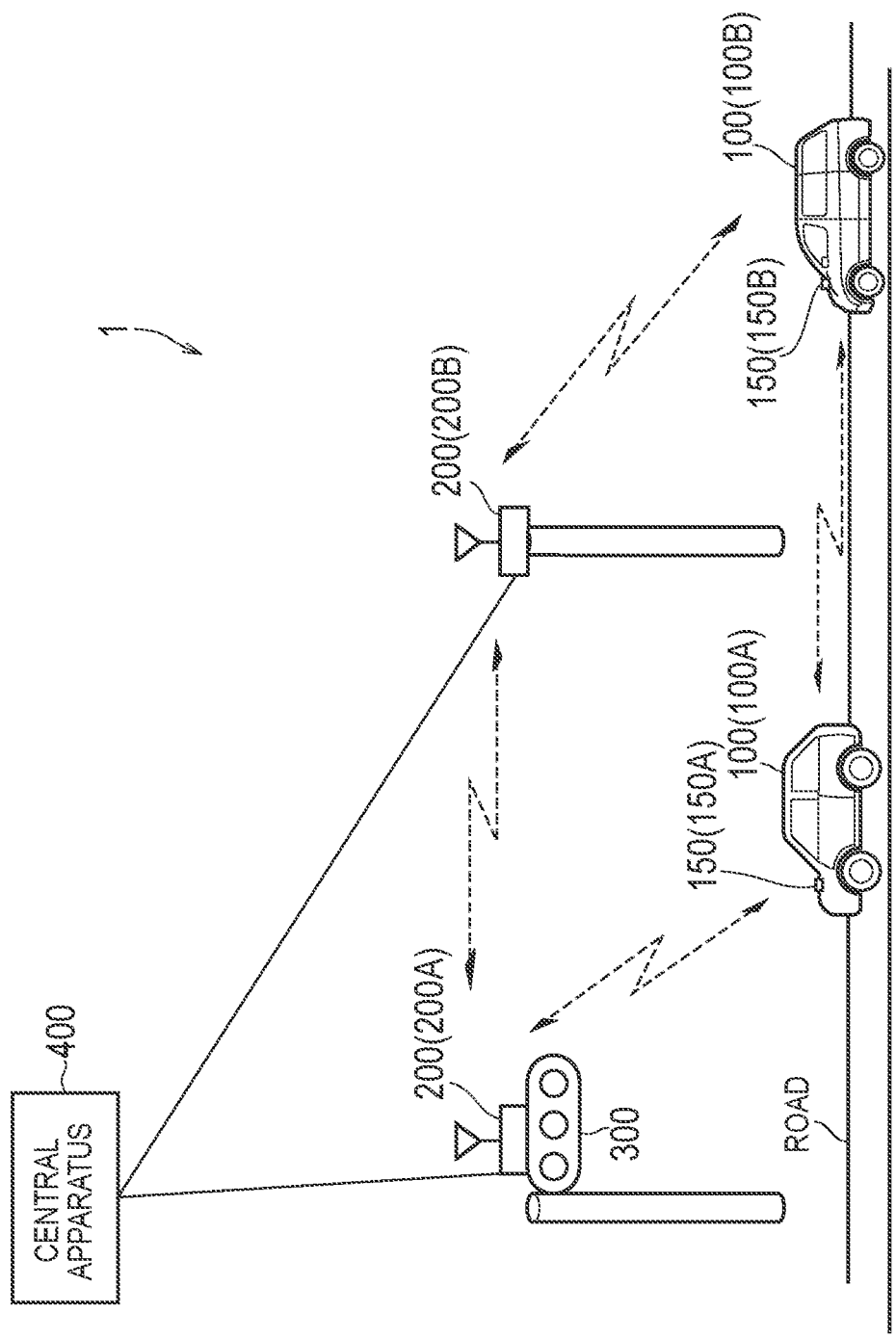
FIG. 1 is a diagram illustrating an overall configuration example of a radio communication system according to an embodiment.

FIG. 1 is a diagram illustrating an overall configuration example of a radio communication system 1 according to a present embodiment. The radio communication system 1 is a radio communication system based on the standard of the Non-Patent Literature 1.

As illustrated in FIG. 1, the radio communication system 1 includes a plurality of vehicles 100, and a plurality of base stations 200. In FIG. 1, vehicles 100A and 100B are exemplified as the plurality of vehicles 100 and base stations 200A and 200B are exemplified as the plurality of base stations 200. Further, though an ordinary automobile, light automobile, or the like are exemplified as the vehicles 100, it may be any vehicle travelling to a road, for example, two-wheeled vehicle (automatic motorcycle) or the like.

A mobile station 150 performing radio communication by the CSMA (Carrier Sense Multiple Access) scheme is installed in each of the vehicles 100. Further, the mobile station 50 may be referred to as an onboard device or onboard communication device.

Each of the base stations 200 is provided near a road. Further, each of the base stations 200 is connected to a central apparatus 400 via a communication channel. The base station 200 may be provided on every intersection of a general road or provided at roadside of highway. The base station 200 may be referred to as a roadside apparatus or roadside communication apparatus. The base station 200A is provided on a traffic signal 300 or an its support. The base station 200A operates in cooperation with the traffic signal 300. The base station 200A may transmit a communication signal including information regarding to the traffic signal 300 (lighting color switching information or the like) as application data. Details of the base station 200 will be described in later.

The radio communication system 1 performs road-to-vehicle communication transmitting and receiving a communication signal between the base station 200 and mobile station 150 (vehicle 100), and inter-vehicle communication transmitting and receiving the communication signal between the mobile stations 150 (between the vehicles 100). Further, the radio communication system 1 may perform road-road communication transmitting and receiving the communication signal between the base stations 200. Radio communication by a broadcast is used in each of the road-to-vehicle communication, inter-vehicle communication, and road-road communication. Concretely, regarding to the communication signal (communication packet), only a broadcast address as a destination address (destination MAC address) is specified.

Each of the base stations 200 is connected to the central apparatus 400 via the communication channel. A vehicle detector provided at the roadside may be connected to the central apparatus 400 via the communication channel.

The central apparatus 400 receives, from each of the base stations 200, vehicle information including position of the vehicle 100, speed, or the like which the base station 200 received from the mobile station 150 (application data). The central apparatus 400 may receive vehicle detection information from a roadside sensor provided at each of the roads, further. The central apparatus 400 collects and processes various types of traffic information based on the received information, integrates a traffic transport system, and manages. For example, the central apparatus 400 transmits a control indication indicating lighting color switching for the traffic signal 300 or transmits traffic information including traffic congestion information or the like (application data) to the base station 200.

(Communication Protocol Stack)

Figure 2:
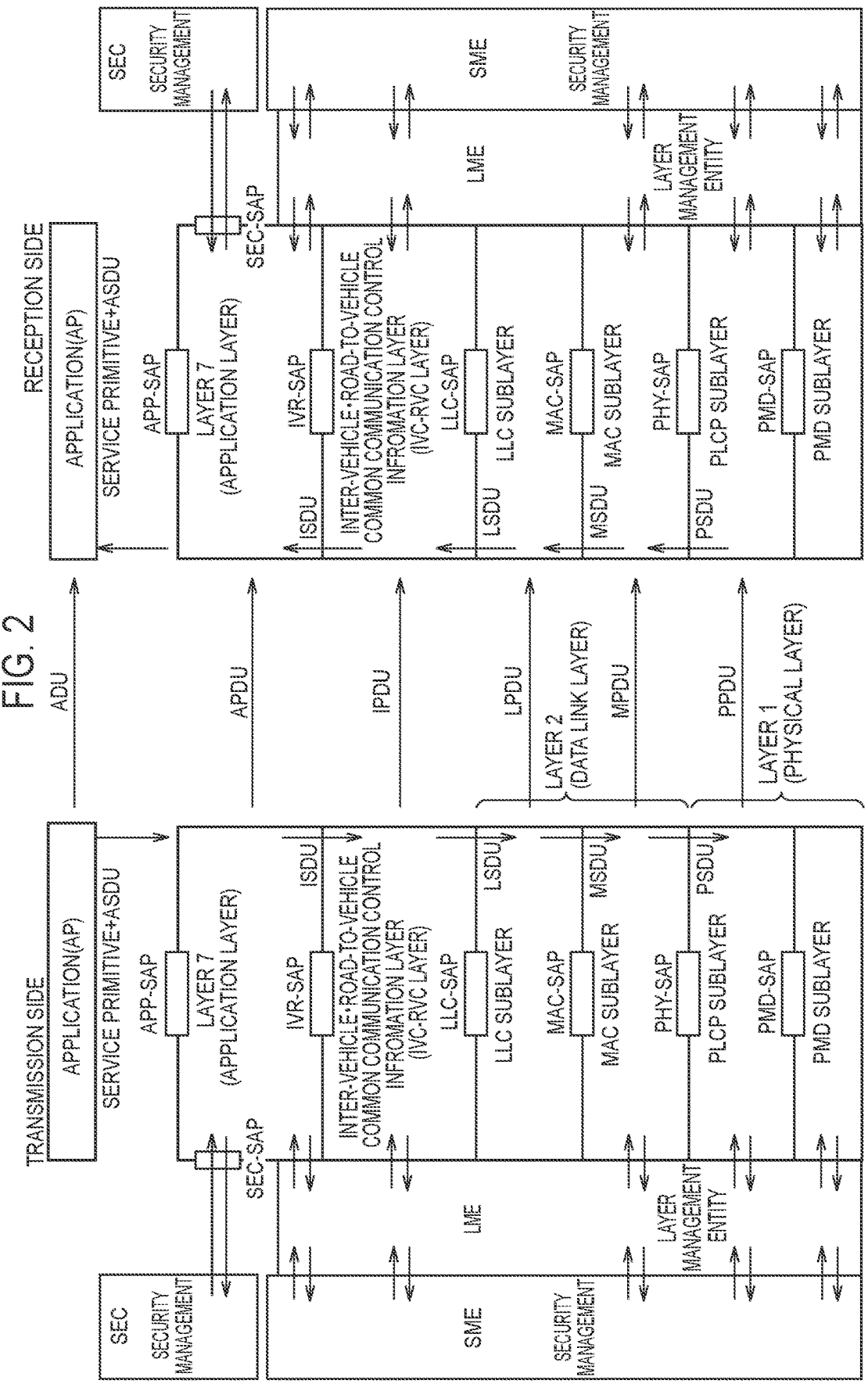
FIG. 2 is a diagram illustrating an example of a communication protocol stack in a radio communication system according to an embodiment.

FIG. 2 is a diagram illustrating an example of a communication protocol stack in the radio communication system 1 according to the present embodiment. The communication protocol stack illustrated in FIG. 2 is applied to each of the road-to-vehicle communication, inter-vehicle communication, and road-road communication.

As illustrated in FIG. 2, each layer of the communication protocol stack is defined based on the OSI Reference Model. The communication protocol stack includes a Layer 1 (L1, Physical layer), Layer 2 (L2, Data Link Layer), Inter-Vehicle•Road-to-Vehicle common communication control information (IVC-RVC: Inter-Vehicle Communication-Road to Vehicle Communication) Layer, and Layer 7 (L7, Application Layer).

The Layer 1 operates in conformity to the physical layer specified in the IEEE802.11.

The Layer 2 includes a MAC (Medium Access Control) sublayer and LLC (Logical Link Control) sublayer. The MAC sublayer may be referred to as a MAC layer merely, and the LLC sublayer may be referred to as LLC layer merely. The MAC layer uses the CSMA/CA scheme as communication control between the mobile stations 150. The MAC layer performs frame control and broadcast communication (broadcast) as communication management of a radio channel. The LLC layer provides connectionless-type service to perform packet transmission between entities of an upper layer.

The Layer 7 provides a communication control means to an application AP. The application AP gives application data stored in a transmitting communication signal (traffic information, vehicle information, or the like) to the Layer 7, and acquires the application data stored in the received communication signal from the Layer 7.

As application of the base station 200, application which performs of acquisition and generation of application data (traffic information•vehicle information or the like) provided to the mobile station 150 or another base station, and transmits its application data by the communication control means provided by the Layer 7 is included. Further, as the application of the base station 200, application which acquires the application data (traffic information•vehicle information or the like) received from the mobile station 150 or the other base station by the communication control means provided by the Layer 7, and processes or transfers is included.

As application of the mobile station 150, application which performs of acquisition and generation of application data (traffic information•vehicle information or the like) provided to another mobile station or the base station 200, and transmits its application data by the communication control means provided by the Layer 7 is included. Further, as the application of the mobile station 150, application which acquires the application data (traffic information•vehicle information or the like) received from the other mobile station or the base station 200 by the communication control means provided by the Layer 7, and processes or transfers is included.

(Road-to-Vehicle Communication Period)

Figure 3:
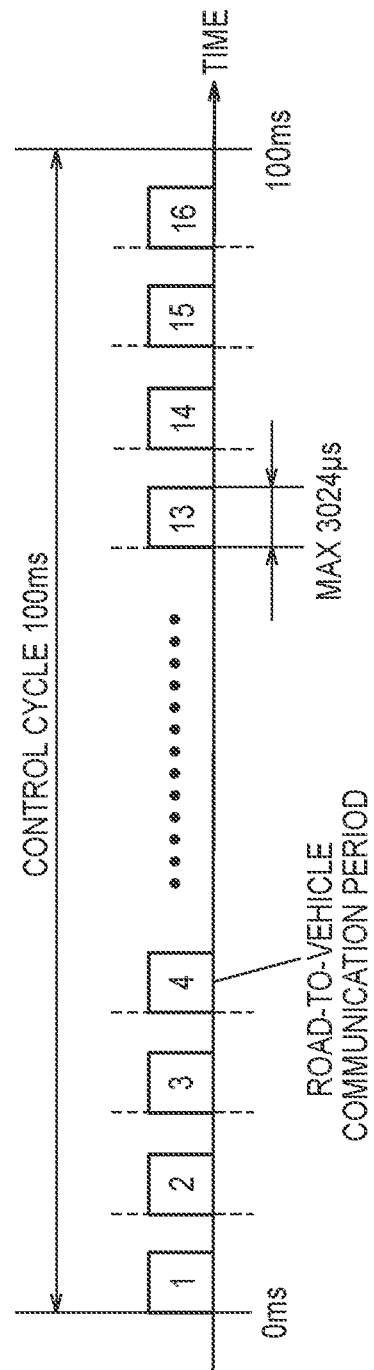
FIG. 3 is a diagram illustrating an example of a road-to-vehicle communication period in a radio communication system according an embodiment.

FIG. 3 is a diagram illustrating an example of a road-to-vehicle communication period in the radio communication system 1 according to the present embodiment.

As illustrated in FIG. 3, the base station 100 and the mobile station 150 performs communication in 100 ms cycle basically. The base station 200 secures own transmission time by notifying transmission time and road-to-vehicle communication period information (number of transfers•road-to-vehicle communication period length) as own transmission information to surrounding the mobile stations 150. Further, it is assumed that synchronization accuracy of ±16 µs or less is to be kept between the mobile stations 150.

The mobile station 150 performs transmission at a timing other than transmission time period of the base station 200, by time synchronizing based on the transmission time received from the base station 200 and stopping own transmission based on the road-to-vehicle communication period information.

"16 µs" is a control unit time (unit) in a control cycle of 100 ms, and the control cycle is configured by 6250 units. A maximum value of the number of the road-to-vehicle communication period possible to set in the one control cycle is "16", and it is arranged at 390 units (6240 µs) interval from the beginning of the control cycle. A maximum value of the road-to-vehicle communication period length possible to set is 189 units (3024 µs).

(Configuration of Base Station)

Figure 4:
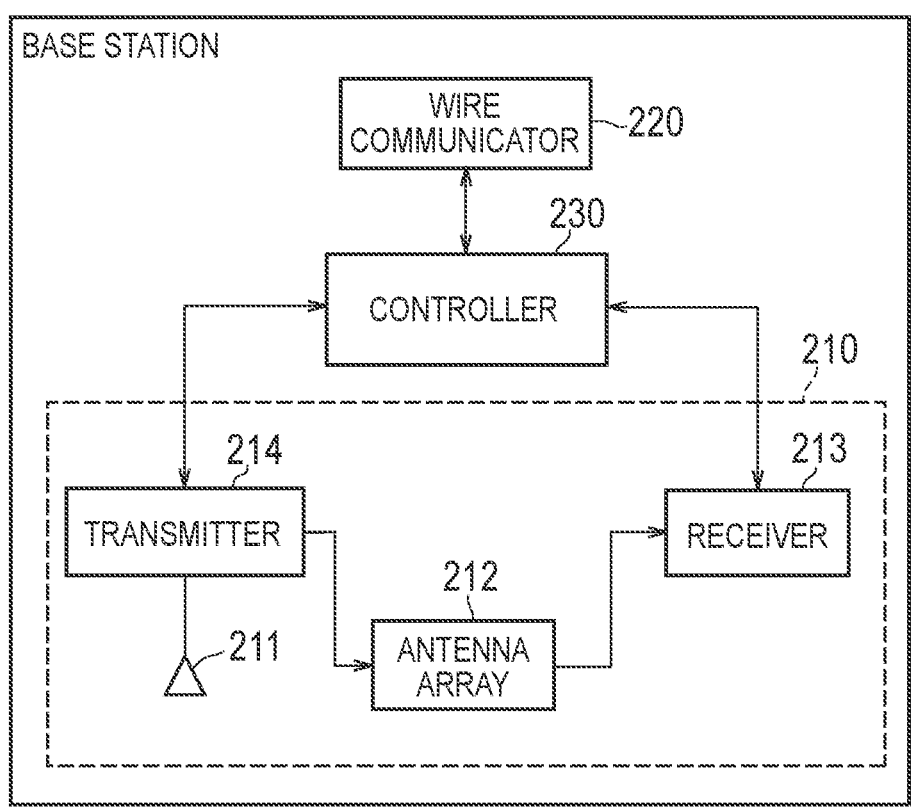
FIG. 4 is a diagram illustrating a configuration example of a base station according to an embodiment.

FIG. 4 is a diagram illustrating a configuration of the base station 200 according to the present embodiment. As illustrated in FIG. 4, the base station 200 includes a radio communicator 210 and wire communicator 220, and controller 230.

The radio communicator 210 is used for radio communication with the mobile station 150 (the road-to-vehicle communication) and radio communication with another base station (the road-road communication). In the present embodiment, it will be described about that the radio communicator 210 is used for the road-to-vehicle communication The radio communicator 210 includes an antenna 211, antenna array 212, receiver 213, and transmitter 214.

The antenna 211 is a nondirectional antenna or directional antenna. If a selective diversity (selective reception) technique is used, a plurality of antennas is provided as the antenna 211. If the antenna 211 is the directional antenna, the antenna 211 has a directivity along with an extending direction of a road provided around the base station 200.

The array antenna 212 include a plurality of antenna elements. The array antenna 212 is used for an adaptive array control controlling the directivity variably (beamforming control). The beamforming include that Null is directed to an interference wave, in addition to that a beam is directed to a desired wave. Further, the array antenna 212 may be a linear array type which the plurality of antenna elements is arranged linearly, a planer array type which the plurality of antenna elements is arranged planarly (two-dimensionally), or a circular array type which the plurality of antenna elements is arranged circularly.

The receiver 213 receives the communication signal (radio signal) from the mobile station 150 under control of the controller 230. The receiver 213 receives the communication signal from the mobile station 150 via the array antenna 212, converts the received communication signal to a baseband signal, and outputs it to the controller 230. Here, the receiver 213 is provided corresponding to each of the antenna elements of the array antenna 212, and includes a weighting unit which weights by using antenna weight and a composition unit which composes a signal weighted in each of the antenna elements and outputs. The antenna weight is a weight coefficient to adjust a phase and amplitude of the signal.

The controller 230 performs various types of controls in the base station 200. The controller 230 includes one processor at least and one memory at least. For example, the controller 230 stores temporarily vehicle information (application data) included in a communication signal which the receiver 213 receives from the mobile station 150, and transfers it to the central apparatus 400 via the wire communicator 220. Further, the controller 230 stores temporarily traffic information (application data) or the like which the wire communicator 220 receives from the central apparatus 400, and controls such that the communication signal including the traffic information is transmitted from the transmitter 214.

The controller 230 calculates the antenna weight based on the communication signal received by the receiver 213. The controller 230 calculates the antenna weight in each of the antenna elements by using a control algorithm based on a predetermined standard. For example, the predetermined standard may be a MMSE (Minimum Mean Square Error) standard. The controller 230 calculates the antenna weight such that difference (error signal) of a replica of the desired wave (reference signal) and an actually array output signal becomes a minimum. If the reference signal is required for the calculation of the antenna weight, the antenna weight may be calculated by using a pilot signal specified by IEEE802.11 as the reference signal. Instead of using the existing pilot signal, a new reference signal for calculation of the antenna weight may be introduced. Or, the predetermined standard may be a CMA (Constant Modulus Algorithm) standard. The controller 230 calculates the antenna weight such that an envelope curve of the array output signal becomes a constant, without need of prior knowledge regarding to the desired wave.

The transmitter 214 transmits the communication signal (radio signal) to the mobile station 150 under control of the controller 230. The transmitter 214 converts the baseband signal input from the controller 230 to the radio signal and outputs. The transmitter 214 includes a distribution unit which distributes the baseband signal input from the controller 230 into each of the antenna elements, and a weight unit which is provided corresponding to each of the antenna elements of the array antenna 212 and weights by using the antenna weight.

The transmitter 214 operates in either one of a first transmission mode transmitting the communication signal by non-directivity or fixed transmission directivity and a second transmission mode transmitting the communication signal by the beamforming. In the first transmission mode, the transmitter 214 converts the baseband signal input from the controller 230 to the radio signal and transmits it from the antenna 211. On the other hand, in the second transmission mode, the transmitter 214 converts the baseband signal input from the controller 230 to the radio signal and transmits it from the array antenna 212. In the second transmission mode, controller 230 provides the antenna weight used at the time of reception in the receiver 213 as transmission antenna weight to the transmitter 214. Further, in the present embodiment, since a same carrier frequency between transmission (uplink direction) from the mobile station 150 to the base station 200 and transmission (downlink direction) from the base station 200 to the mobile station 150 is used, it is possible to use same antenna weight in the uplink•downlink by utilizing reversibility of a propagation path. In the following, the communication signal of the uplink direction is referred to as a first communication signal and the communication signal of the downlink direction is referred to as a second communication signal.

According to the first transmission mode, by transmitting the second communication signal by the non-directivity or fixed transmission directivity, each of the mobile stations 150 in a predetermined area can receive the second communication signal from the base station 200. According to the second transmission mode, by transmitting the second communication signal by a transmission beamforming, it is possible to improve communication quality in the specific mobile station 150. However, in the second transmission mode, the communication quality may deteriorate since the null is directed to a mobile station other than the specific mobile station 150.

Here, it is general that the base station 200 performs transmission to unspecific number of the mobile stations 150 in the road-to-vehicle communication performed by broadcast. Therefore, the controller 230 sets the first transmission mode basically and transmits the second communication signal from the transmitter 214 by the non-directivity or fixed transmission directivity.

On the other hand, when the base station 200 transmits the second communication signal including application data for a predetermined type of the vehicle 100, it is preferable to improve communication quality of the mobile station 150 installed on the predetermined type of the vehicle 100. For example, when the base station 200 transmits the second communication signal including application data for a bus, it is preferable to improve the communication quality of the mobile station 150 installed on the bus. Therefore, the base station 200 improves the communication quality of the mobile station 150 installed on the bus, by adapting the second transmission mode (transmission beamforming), when the base station 200 determines that the mobile station 150 is installed on the bus based on the first communication signal received from the mobile station 150.

Further, when there is the vehicle 100 in emergency traveling and a vehicle other than the vehicle 100 in the emergency traveling evacuates, it is preferable to improve communication quality of the mobile station 150 installed on the vehicle in the emergency traveling. Therefore, the base station 200 improves the communication quality of the mobile station 150 installed on the vehicle 100 in the emergency traveling, by adapting the second transmission mode (transmission beamforming), when the base station 200 determines that the mobile station 150 is installed on the vehicle 100 in the emergency traveling based on the first communication signal received from the mobile station 150.

In this way, the base station 200 according to the present embodiment includes the receiver 213 configured to receive the first communication signal broadcasted from the mobile station 150 installed on the vehicle 100, the controller 230 configured to calculate antenna weight forming a beam to the mobile station 150 based on the received first communication signal, and the transmitter 214 configured to transmit the second communication signal to the mobile station 150 by a transmission beamforming by using the calculated antenna weight. Herewith, it is possible to improve communication quality in the road-to-vehicle communication performed by broadcast.

The second communication signal transmitted by the base station 200 includes a broadcast address as a destination address (destination MAC address). In this way, by adapting the transmission beamforming to the broadcasted second communication signal, it is possible to improve the communication quality in the road-to-vehicle communication performed by broadcast.

When a predetermined vehicle information indicating that a type of the vehicle 100 is a predetermined type (for example, a bus) is included in the first communication signal, the controller 230 switches from the first transmission mode to the second transmission mode (transmission beamforming) and may transmit the second communication signal by the second transmission mode. For example, the first communication signal has a field storing information indicating the type of the vehicle 100 on which the mobile station 150 of a transmission source is installed or a flag indicating whether or not the type of the vehicle 100 is the predetermined type. The controller 230 determines whether or not the type of the vehicle 100 is the predetermined type based on the field.

When a predetermined vehicle information indicating that a state of the vehicle 100 is a predetermine state (for example, in emergency traveling) is included in the first communication signal, the controller 230 switches from the first transmission mode to the second transmission mode (transmission beamforming) and may transmit the second communication signal by the second transmission mode. For example, the first communication signal has a field storing information indicating the state of the vehicle 100 on which the mobile station 150 of the transmission source is installed or a flag indicating whether or not the state of the vehicle 100 is the predetermined type. The controller 230 determines whether or not the state of the vehicle 100 is the predetermined state based on the field.

However, a number of beams possible to form by the base station 200 is limited. For example, when the base station 200 use a single carrier frequency, the number of beams possible to form by one-time transmission is one. When the receiver 213 receives a plurality of the first communication signals including predetermined vehicle information from a plurality of the mobile stations 150 corresponding to a plurality of the vehicles 100 and a number of the plurality of mobile stations 150 is equal to or more than a threshold value (for example, "2"), within predetermined time, the controller 230 may switch from the second transmission mode to the first transmission mode. The predetermined time may be time until a prescribed time period elapses from a timing of receiving, by the receiver 213, the first communication signal including the predetermined vehicle information from one of the mobile stations 150, or may be a predetermined time interval (for example, every one minute).

For example, when the controller 230 receives the first communication signal from one bus while receiving the first communication signal from another bus and adapting the second transmission mode, the controller 230 switches from the second transmission mode to the first transmission mode. Herewith, each of the buses can receive the second communication signal from the base station 200 adequately. Or, when the controller 230 receives the first communication signal form one vehicle in emergency travelling while receiving the first communication signal from another vehicle in emergency travelling and adapting the second transmission mode, the controller 230 switches from the second transmission mode to the first transmission mode. Herewith, each of the vehicles in emergency travelling can receive the second communication signal from the base station 200.

(Configuration of Mobile Station)

Figure 5:
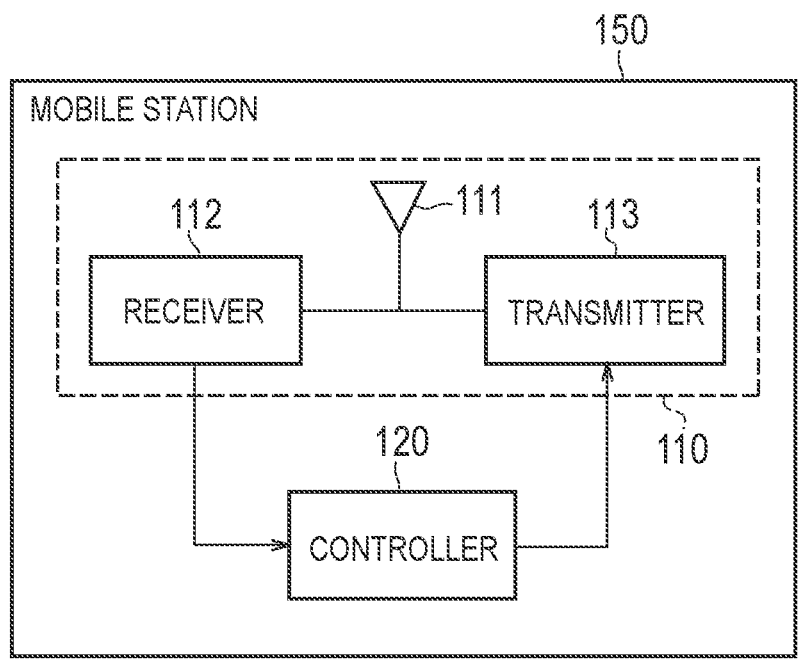
FIG. 5 is a diagram illustrating a configuration example of a mobile station according to an embodiment.

FIG. 5 is a diagram illustrating the mobile station 150 according to the present embodiment. As illustrated in FIG. 5, the mobile station 150 includes a radio communicator 110 and controller 120.

The radio communicator 110 is used for radio communication with the base station 200 (road-to-vehicle communication) and radio communication with another mobile station (inter-vehicle communication). The radio communicator 110 includes an antenna 111, receiver 112, and transmitter 113. The receiver 112 receives a radio signal under control of the controller 120. The receiver 112 converts the radio signal received by the antenna 111 into a baseband signal (received signal), and outputs it to the controller 120. The transmitter 113 transmits a radio signal under control of the controller 120. The transmitter 113 converts the baseband signal (transmitting signal) output from the controller 120 into the radio signal, and transmits it from the antenna 111.

The receiver 112 performs a carrier sense. Concretely, the receiver 112 monitors a reception level of a predetermined carrier frequency all times, does not perform radio transmission when the reception level is equal to or more than a threshold value, and the transmitter 113 performs the radio transmission only when the reception level is less than the threshold value.

The controller 120 performs various type controls of the mobile station 150. The controller 120 includes one processor at least and one memory at least. The controller 120 broadcasts a communication signal including vehicle information (application data) including a current position, direction, speed, and so on, of the vehicle 100 (mobile station 150), outside via the radio communicator 110. Also, the controller 120 can perform a vehicle safety driving support control to avoid right-turn collision, crossing collision, or the like based on the vehicle information (application data) included in the communication signal received by the receiver 112 from another vehicle.

Further, when the receiver 112 receives allocation information of a timeslot broadcasted by the base station 200, the controller 120 generates a communication frame including the allocation information, broadcasts a radio signal of the communication frame, and transfers the allocation information to another mobile station. Also, the controller 120 performs radio transmission by a carrier sense scheme at a time zone that the base station 200 transmitting the allocation information does not perform transmission.

In the present embodiment, when the type of the vehicle 100 on which the mobile station 150 is installed is the predetermined type (for example, bus), the controller 120 may control the transmitter 113 so as to transmit the communication signal including the predetermined vehicle information indicating that the type of the vehicle 100 is the predetermined type. When the state of the vehicle 100 on which the mobile station 150 is installed is the predetermined state (for example, in emergency travelling), the controller 120 controls the transmitter 113 so as to transmit the communication signal including the predetermined vehicle information indicating that the state of the vehicle 100 is the predetermines state.

(Operation of Base Station)

FIG. 6 is a flow diagram illustrating an operation example of the base station 200 according to the present invention.

As illustrated in FIG. 6, in Step S1, the controller 230 sets a first transmission mode. In the first transmission mode, the controller 230 transmits a second communication signal at every predetermined allocation timeslot (road-to-vehicle communication period) by non-directivity or fixed transmission directivity.

In Step S2, the controller 230 confirms whether or not the receiver 213 receives a first communication signal from the mobile station 150.

When the receiver 213 receives the first communication signal from the mobile station 150 (Step S2: YES), in Step S3, the controller 230 calculates antenna weight based on the communication signal received by the receiver 213. The receiver 213 performs a reception process including a weighting by the antenna weight and outputs the reception signal to the controller 230.

In Step S4, the controller 230 confirms whether or not a predetermined vehicle information indicating that a type of vehicle 100 on which the mobile station 150 of a transmission source of the first communication signal is installed is a predetermined type (for example, bus), or a predetermined vehicle information indicating that a state of the vehicle 100 is a predetermined state (for example in emergency travelling) is included in the received first communication signal (received signal).

When the predetermined vehicle information is not be included in the received first communication signal (Step S4: NO), in Step S1, the controller 230 maintains the first transmission mode. On the other hand, when the predetermined vehicle information is included in the received first communication signal (Step S4: YES), in Step S5, the controller 230 switches from the first transmission mode to the second transmission mode. After that, the process returns to Step S2. In the second transmission mode, the controller 230 transmits a second communication signal by a transmission beamforming, by using the antenna weight calculated by step S3 at every predetermined allocation timeslot (road-to-vehicle communication period).

Summary of Embodiments

As described above, the base station 200 according to the present embodiment includes the receiver 213 configured to receive the first communication signal broadcasted from the mobile station 150 installed on the vehicle 100, the controller 230 configured to calculate antenna weight forming a beam to the mobile station 150 based on the received first communication signal, and the transmitter 214 configured to transmit the second communication signal to the mobile station 150 by the transmission beamforming by using the calculated antenna weight. Herewith, it is possible to improve communication quality in the road-to-vehicle communication performed by broadcast.

(Modified Examples)

Though the above embodiments do not consider about a scenario that a towing vehicle towing one or more towed vehicles exists, a control considering the towing vehicle may be performed. A towing scheme may be a physical towing scheme that the vehicle 100 is connected by a cable or the like, or an electronic towing scheme that the vehicle 100 is towed by a radar, communication, or the like. In such the towing, communication between the vehicles (inter-vehicle communication) to maintain the towing adequately may be performed.

When such the towing is performed, the towed vehicle is towed by the towing vehicle, and it is considered that the need to receive the second communication signal from the base station 200 is low. Therefore, in the present modified example, when the base station 200 identifies a train of vehicles consisted of the towing vehicle and towed vehicle, the base station 200 performs a transmission beamforming to the towing vehicle.

In the present modified example, the mobile station 150 transmits a first communication signal including an information element indicating whether or not one or more the towed vehicles are towed by the towing vehicle. For example, the information element may be a one-bit flag indicating presence or absence of the towing.

When the vehicle 100 on which the mobile station 150 is installed is the towing vehicle, the mobile station 150 may transmit the first communication signal including an information element whether or not the towing vehicle is towing one or more the towed vehicles. For example, the information element may be a one-bit flag indicating whether or not the vehicle 100 is the towing vehicle. Or, when the vehicle 100 is the towed vehicle, the mobile station 150 may transmit the first communication signal including an information element indicating whether or not being towed by the towing vehicle. For example, the information element may be a one-bit flag indicating whether or not the vehicle 100 is the towed vehicle. Or, the information element may be a one-bit flag indicating whether the vehicle 100 is the towing vehicle or the towed vehicle.

When one or more the towed vehicles are towed by the towing vehicle, the mobile station 150 may transmit the first communication signal including an information element indicating how many vehicles from a lead vehicle in the train of vehicles including the towing vehicle and towed vehicle the own vehicle 10 is. The information element may be represented by ○○th vehicle from the lead vehicle, or ○○/xx. Here, xx is a number of the vehicles 10 configuring the train of vehicles.

In the present modified example, when the receiver 213 receives a plurality of the first communication signals from a plurality of the mobile stations 150 corresponding to a plurality of the vehicles 100, within a predetermined time, the controller 230 of the base station 200 adapts a transmission beamforming to a part of the mobile stations 150 out of the plurality of the mobile stations 150 based on information (information element) included in the plurality of the first communication signals. The predetermined time may be a time until a prescribed time period elapses from a timing that the receiver 213 receives the first communication signal from one of the mobile stations 150, or a predetermined time interval (for example, one minute).

When the controller 230 of the base station 200 determines that the towing vehicle 100 and one or more the towed vehicles 100 towed by the towing vehicle 100 are included in the plurality of vehicles 100 based on the information (information element) included in the plurality of the first communication signals, the controller 230 adapts the transmission beamforming to the mobile station 150 installed on the towing vehicle 100.

In this way, when the controller 230 identifies the train of vehicles consisted of the towing vehicle and towed vehicles, the controller 230 can perform the transmission beamforming adequately in a scenario that the towing vehicle exists, by performing the transmission beamforming to the towing vehicle.

Other Embodiments

In the above embodiments, though it is described about the example that the base station 200 provided at the roadside is a base station of integration type of an antenna and body, the base station 200 may be a base station of separation type of the antenna and body. In this case, an antenna part of the base station 200 may be provided around the road, a body part of the base station 200 may be provided apart from the road, and the antenna part and body part may be connected via a cable.

Though it is described about a format conforming to the ARIB T109 as the communication protocol of the embodiments of the above system, the communication protocol may conform to V2X of 3GPP, or may be a scheme of wireless RAN or the like. The base station 200 may be configured by all-in-one possible to correspond all these communication standards. In a case of the V2X of 3GPP, broadcast may be an MBMS (Multimedia Broadcast Multicast Service). For example, a single cell Point-to-Multipoint (SC-PTM) transmission realizing an MBMS technology is available.

Though it is described with reference to the drawings about the embodiments in details, concrete configuration is not limited to the above, various design changes or the like are possible without deviating from the gist of the invention.

The invention claimed is:

1. A base station provided around a road, the base station comprising:
   a receiver configured to receive a first communication signal broadcasted from a mobile station installed on a vehicle;
   a controller configured to calculate antenna weight forming a beam to the mobile station based on the received first communication signal; and
   a transmitter configured to transmit a second communication signal to the mobile station by a transmission beamforming, by using the calculated antenna weight, wherein
   predetermined vehicle information indicating that a type of the vehicle is a predetermined type is included in the first communication signal to indicate a characteristic of the vehicle,
   the transmitter is configured to operate in either a first transmission mode transmitting the second communication signal by non-directivity or fixed transmission directivity or a second transmission mode transmitting the second communication signal by the transmission beamforming,
   the controller is configured to switch from the first transmission mode to the second transmission mode, when the receiver is configured to receive the first communication signal including the predetermined vehicle information, and
   the controller is configured to switch from the second transmission mode to the first transmission mode, when the receiver is configured to receive a plurality of the first communication signal including the predetermined vehicle information from a plurality of the mobile stations corresponding to a plurality of the vehicles and a number of the plurality of the mobile stations is equal to or more than a threshold value.

2. The base station according to claim 1, wherein the second communication signal includes a broadcast address as a destination address.

3. The base station according to claim 1, wherein the predetermined type is a bus.

4. The base station according to claim 1, wherein the predetermined vehicle information indicates that a state of the vehicle is a predetermined state and is included in the first communication signal to indicate an emergency state of the vehicle.

5. The base station according to claim 4, wherein the predetermined state is a state in emergency travelling.

6. The base station according to claim 1, wherein the controller is configured to apply the transmission beamforming to a part of the mobile stations out of the plurality of mobile stations based on information included in the plurality of the first communication signal.

7. The base station according to claim 1, wherein the controller is configured to apply the transmission beamforming to a part of the mobile stations out of the plurality of mobile stations based on information included in the plurality of the first communication signal, and
   the predetermined vehicle information indicates whether the vehicle is a bus.

8. A base station provided around a road, the base station comprising:
   a receiver configured to receive a first communication signal broadcasted from a mobile station installed on a vehicle;
   a controller configured to calculate antenna weight forming a beam to the mobile station based on the received first communication signal; and
   a transmitter configured to transmit a second communication signal to the mobile station by a transmission beamforming, by using the calculated antenna weight, wherein
   the controller is configured to adapt the transmission beamforming to the mobile station, based on information included in the first communication signal, the information indicating a characteristic of the vehicle or an emergency state of the vehicle,
   the mobile station is included in a plurality of mobile stations,
   the receiver is configured to receive a plurality of first communication signals broadcasted from the plurality of mobile stations corresponding to a plurality of vehicles,
   the controller is configured to apply the transmission beamforming to a part of the mobile stations out of the plurality of mobile stations based on information included in the plurality of first communication signals, and the controller is configured to adapt the transmission beamforming to the mobile station installed on a towing vehicle, when the controller is configured to determine that the towing vehicle and one or more towed vehicles towed by the towing vehicle are included in the plurality of vehicles based on the information included in the plurality of first communication signals.

9. A control method of a base station provided around a road, the method comprising:

receiving a first communication signal broadcasted from a mobile station installed on a vehicle;

calculating antenna weight forming a beam to the mobile station based on the received first communication signal, predetermined vehicle information indicating that a type of the vehicle is a predetermined type being included in the first communication signal to indicate a characteristic of the vehicle;

transmitting a second communication signal to the mobile station by a transmission beamforming, by using the calculated antenna weight, the second communication signal being transmitted by non-directivity or fixed transmission directivity in a first transmission mode or by the transmission beamforming in a second transmission mode, switching from the first transmission mode to the second transmission mode, when the first communication signal including the predetermined vehicle information is received, and switching from the second transmission mode to the first transmission mode, when a plurality of the first communication signal including the predetermined vehicle information from a plurality of the mobile stations corresponding to a plurality of the vehicles is received and a number of the plurality of the mobile stations is equal to or more than a threshold value.

* * * * *